April 7, 1936.  G. F. MARCIANO  2,036,591
OPHTHALMIC MOUNTING
Filed July 30, 1932
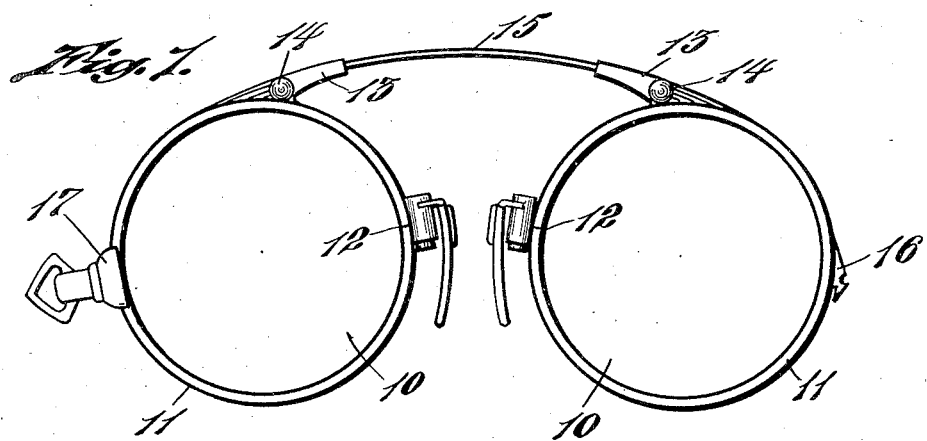
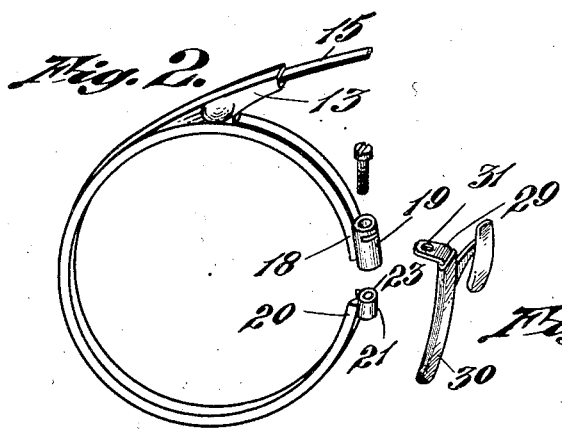
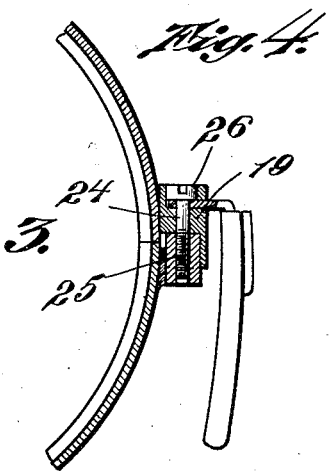
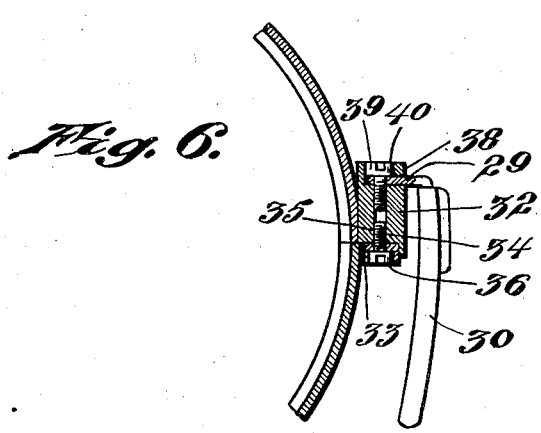
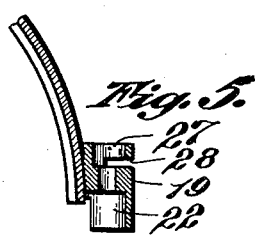
INVENTOR.
Gerardo F. Marciano
BY
Barlow & Barlow
ATTORNEYS.

Patented Apr. 7, 1936

2,036,591

UNITED STATES PATENT OFFICE 2,036,591

OPHTHALMIC MOUNTING

Gerardo F. Marciano, Providence, R. I., assignor to Universal Optical Corporation, a corporation of Rhode Island Application July 30, 1932, Serial No. 626,344

3 Claims. (Cl. 88—44)

This invention relates to an ophthalmic mounting more particularly of the oxford type, and has for one of its objects to provide a construction by which the nose pad and lens rim are detachably held together at substantially the same point.

Another object of the invention is the provision of a construction by which the nose pad will be readily interchangeable.

A further object of the invention is the provision of a construction which will be neat in appearance, simple to manufacture, and one which will look well upon the face of the wearer.

With these and other objects in view, the invention consists of certain novel features of construction, as will be more fully described and particularly pointed out in the appended claims.

In the accompanying drawing:—

Fig. 1 is a face view of an oxford equipped with my invention.

Fig. 2 is a perspective view of a lens rim separated with the attaching screw spaced from the members through which it extends and showing the bridge as broken off intermediate its ends.

Fig. 3 is a perspective view of the nose pad.

Fig. 4 is a sectional view of the lens rim and nose pad in assembled relation.

Fig. 5 is a sectional view of the upper barrel and lens rim of the construction shown in Fig. 4.

Fig. 6 is a sectional view showing a modified form of construction in which the nose pad and means for securing the rims together are separable, each independently of the other.

It has been usual in the making of oxfords to attach the nose pads at the inner edges of the rims and provide the separable ends of the rims at their point of connection with the bridge; however, in such constructions the nose guards are not detachable or interchangeable; and in order that a detachable nose pad may be formed, I have combined its mounting with the separable ends of the rim, and I have positioned these separable ends at the inner edge of the rim and have secured the nose pad in position by a bolt by which the nose pad may be readily interchanged and in certain forms of construction this pad may be interchanged without disturbing the connection of the lens rim ends; and the following is a detailed description of the present embodiment of this invention illustrating the preferred means by which these advantageous results may be accomplished.

With reference to the drawing, 10 designates a lens and 11 the lens rim thereabout which is separable as at 12 at the inner edge thereof. At the upper edge, knuckles 13 are provided as at 14 while a flexible bridge 15 connects these knuckles together to permit folding of one lens and its rim upon the other that they may assume closed position, in which position the usual catch 16 and handle 17 containing a latch is provided for holding the parts in folded relation, as is customary in oxfords.

To the upper end 18 of the lens rim there is secured a barrel member 19 and to the lower end 20 of the lens rim there is provided a barrel member 21 which is of a size to be received partially within the recess 22 of the barrel 19 as illustrated in Figs. 4 and 5. The barrel 21 is threaded as at 23 and a securing member or pin 24 extends through the barrel 19 and is threaded at its end 25 to engage the threads 23 of the barrel 21 and hold the barrels and the ends of the rim in closed position.

The pin 24 is provided with a head 26 which is received within the enlarged recess 27 of the barrel 19 that the head of the pin may lie flush or slightly below the end of the barrel 19. This barrel is also provided with a slot 28 which receives the arm 29 of the nose pad 30. The arm 29 is provided with an opening 31 which, when the arm extends through the slot 28, receives the pin 24 and is thus held in position. As no threads are provided on the upper portion of the pin member 24 or on the walls of the opening 31 this guard may move about this pin to assume a position upon the nose of the wearer at which it will best fit.

In the construction illustrated in Fig. 6, I have provided a barrel member 32 of a length greater than the barrel 19, while the barrel 33 is shorter than the barrel 21. A bolt or screw 34 is passed through the barrel 33 and engages threads 35 on the lower portion of the barrel 32 with the head 36 of this member being received in a recess in the barrel 33 similarly as above described in connection with the bolt 24.

A slot 38 is provided in the barrel 32 to receive the arm 29 of the pad 30. The pin 39 extends through this arm 29 and the head 40 of the pin is received in a recess in the same manner as above described in connection with Fig. 4. In Fig. 6, however, by reason of the fact that the pin 39 holds merely the nose pad or guard in position while the bolt 34 holds the ends of the rims in assembled position, either the lens may be removed or the nose guard removed each without disturbing of the other, whereby interchangeability of the nose pad may be very satisfactorily accomplished.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:—

1. In a folding oxford, a pair of lens rims having separable ends at their inner edges, a flexible bridge hinged to said lens rims at their upper edges, elongated barrel members on each of said separable ends at a point spaced from said hinge connection of said bridge, removable locking members completely housed in said barrel members for securing the barrel members of each rim together and nose pads provided with means through which the locking members extend to mount them in desired position.

2. In a folding oxford, a pair of lens rims having separable ends at their inner edges, elongated barrel members on each of said separable ends, a pin extending through said barrels and completely housed therein to separably secure them together; one of said barrels being slotted between its ends and at generally right angles to its axis, a nose pad provided with an arm extending through said slot and having an opening therein through which the pin extends.

3. In a folding oxford, a pair of lens rims having separable ends at their inner edges, elongated barrel members on each of said separable ends, a pin extending through said barrels to separable secure them together; one of said barrels being slotted between its ends and at generally right angles to its axis, a nose pad provided with an arm extending through said slot and having an opening therein through which the pin extends, the end walls of said slot being a distance apart greater than the width of said arm to permit movement of the arm in said slot about said pin.

GERARDO F. MARCIANO.